United States Patent [19]

Adibi

[11] 4,340,592

[45] Jul. 20, 1982

[54] NUTRIENT COMPOSITIONS AND METHOD OF ADMINISTERING THE SAME

[76] Inventor: Siamak A. Adibi, 1154 Wightman St., Pittsburgh, Pa. 15217

[21] Appl. No.: 227,127

[22] Filed: Jan. 26, 1981

Related U.S. Application Data

[63] Continuation-in-part of Ser. No. 130,309, Mar. 14, 1980, abandoned.

[51] Int. Cl.³ .............................................. A61K 37/00
[52] U.S. Cl. .................................................... 424/177
[58] Field of Search ......................................... 424/177

[56] References Cited

U.S. PATENT DOCUMENTS 4,095,000 6/1978 Brenner ........................ 260/112.5 R
4,127,534 11/1978 Coy et al. ............................ 424/177

*Primary Examiner*—Stanley J. Friedman
*Attorney, Agent, or Firm*—Thomas H. Murray

[57] ABSTRACT

Method for administering dipeptides and tripeptides to mammals for dietary purposes, orally, intragastrointestinally and intravenously. The tripeptides and dipeptides, contain glycine as the amino acid residue which provides the N-terminal amino acid grouping. Other amino acid residues contained in the tripeptide or dipeptide can include leucine, isoleucine, valine, threonine, methionine, phenylalanine, lysine, tryptophan, alanine, arginine, histidine, alanine, proline and glutamic acid.

12 Claims, No Drawings

NUTRIENT COMPOSITIONS AND METHOD OF ADMINISTERING THE SAME

The invention described herein was made in the course of work under a grant or award from the Department of Health, Education and Welfare.

CROSS-REFERENCES TO RELATED APPLICATIONS (IF ANY)

This application is a continuation-in-part of my copending U.S. patent application Ser. No. 130,309 filed Mar. 14, 1980, now abandoned.

BACKGROUND OF THE INVENTION

1. Field of the Invention

This invention relates to nutrient compositions for mammals and more particularly to nutrient compositions containing oligopeptides and methods of administering them to mammals.

2. Description of the Prior Art

Man and other mammals require protein daily to satisfy vital functions. Proteins are converted to amino acids in the digestive system and the resulting amino acids are employed by the body for growth, development, multiplication and metabolic functions. The human body requires a daily supply of the essential amino acids which are lysine, leucine, isoleucine, tryptophan, methionine, valine, phenylalanine, and threonine. There are other amino acids, called "non-essential," which the body employs as a source of nitrogen. The non-essential amino acids are alanine, glycine, serine, proline, histidine, tyrosine and cysteine.

In the absence of the essential amino acids, there is a rapid deterioration of the nutritional state which results in dysfunction of practically every organ in the body with consequent health problems such as liver failure, anemia, infection, diarrhea and retarded growth.

In the absence of protein or in circumstances where a medical patient is unable to assimilate protein, it is possible to supply free amino acids intravenously and intragastrointestinally as a solution. Elemental diets which were popular in the practice of medicine in the 1970's employed such solutions of free amino acids. These solutions are hypertonic. Hypertonic solutions, whether in the intestines or in the blood vessels are not well tolerated and may cause undesirable effects such as diarrhea and dehydration. These problems may be critical in sick patients.

While the body can matabolize amino acids, the body's transport system can more effectively utilize peptides which can be absorbed and thereafter hydrolyzed within the body's cells to amino acids.

More recent discoveries have indicated that the human digestive system includes separate sites for absorption of dipeptides and absorption of tripeptides in the intestinal mucosa. When absorbed, the dipeptides and tripeptides are hydrolyzed into constituent amino acids. The hydrolysis thus occurs after the peptides are within a body cell. See Adibi and Soleimanpour, J. Clin. Invest. 53: 1368–1374 (1974).

The peptide transport system has the following features:

(a) It does not take up amino acids, but instead transports dipeptides and tripeptides.
(b) It has little or no affinity for peptides with more than three amino acids residues.
(c) It has higher maximum rate of uptake than an amino acid carrier system.
(d) It prefers peptides with lipophilic amino acids in the N-terminal position.
(e) Its greatest activity is in the jejunum and its least activity is in the duodenum with the ileum being between these extremes.

The elemental diets employing free amino acids are usually hypertonic. The hypertonicity creates secondary problems in medical patients with gastrointestinal disorders.

There are reports of the administration of a single dipeptide or a single tripeptide for academic clinical evaluation.

However today there remains a problem of supplying adequate amino acid nutrients to a mammal such as a human medical patient, in a form where the amino acid content can be assimilated by the transport system without the adverse effects of hypertonicity.

STATEMENT OF THE INVENTION

According to the present invention, a nutrient composition is provided which is an aqueous solution of oligopeptides (dipeptides and/or tripeptides) wherein each of the oligopeptides has a glycine residue as the N-terminal amino acid grouping. The aqueous solution of oligopeptides can be supplied at twice (in the case of dipeptides) or three times (in the case of tripeptides) the concentration of amino acids at the same osmolality as a corresponding solution of free amino acids. Moreover the oligopeptides are readily assimilated by the transport system and readily converted to amino acid residues. Within the body cells, the oligopeptides of this invention have a glycine grouping as the N-terminal grouping of the oligopeptides. The glycine terminated oligopeptides achieve a desirable intact transport of the oligopeptide into a cell. The glycine grouping protects the oligopeptide from hydrolysis into amino acids by the peptidases on a cell membrane. Premature hydrolysis of the oligopeptide into amino acids would upset the osmolality of the system. The glycine grouping is also lipophilic and the oligopeptide has an enhanced transport through the cell membrane. The oligopeptide can be cleaved into its component amino acids inside the body cell.

The glycine-terminated oligopeptides are particularly water-soluble which permits the use of such oligopeptides in high concentrations. This feature is of special importance in treating patients having a restricted-water diet, e.g., certain heart patients and kidney patients. The glycine-terminated oligopeptides have good thermal stability which permits the autoclaving of such materials for sterilization. The glycine-terminated oligopeptides in solution also have good shelf-life stability.

The oligopeptides may be administered intravenously, along with other nutrient compositions such as fats, glucose, saccharides, minerals, trace elements and vitamins. The oligopeptide solution may be introduced orally or by other intragastrointestinal administration techniques, e.g., stomach tubes and insertion tubes elsewhere in the intestinal tract.

SUMMARY OF THE INVENTION

The oligopeptide solution contains from about one to twenty percent by weight of the oligopeptides, preferably about one to five percent by weight. The aqueous solution may be an electrolyte solution suitable for intravenous feeding or for intragastrointestinal administration. The aqueous solution itself may contain the other nutrient additives such as fats, glucose, mono- or oligo saccharides, minerals, trace elements and vitamins.

DETAILED DESCRIPTION OF THE INVENTION

Aqueous dietary compositions are prepared which include at least two tripeptides or at least two dipeptides or mixtures containing at least one dipeptide and at least one tripeptide. The term oligopeptide, as used herein, includes dipeptides and tripeptides. The oligopeptides include a glycine residue and one or two other essential amino acid residues such as lysine, leucine, isoleucine, tryptophan, methionine, valine, phenylalanine, threonine; or non-essential amino acids such as arginine, histidine, alanine, proline and glutamic acid. The glycine residue is the N-terminal residue in the oligopeptide.

The concentration of the oligopeptide in the aqueous solution is from 1 to 20 percent by weight, preferably from 1 to 5 percent by weight. Aqueous solutions containing about 2.5 weight percent of the oligopeptides have useful biological absorption characteristics. The selection of the oligopeptides in the composition depends upon the requirements for essential and non-essential amino acids.

A typical mixture of tripeptides is set forth in Table 1.

The mixture of Table 1 is intended to approximate one 850-mg. portion of a protein of high biological value. The mixture of Table 1, in one liter of water, comprises a useful nutrient composition.

TABLE 1

| One 850-mg. Portion | |
|---|---|
| Tripeptides | Amount (mg) |
| glycine-leucine-leucine | 77 |
| glycine-isoleucine-isoleucine | 59 |
| glycine-valine-valine | 70 |
| glycine-threonine-threonine | 53 |
| glycine-methionine-methionine | 71 |
| glycine-phenylalanine-phenylalanine | 75 |
| glycine-lysine-lysine | 57 |
| glycine-tryptophan-tryptophan | 21 |
| glycine-alanine-alanine | 367 |

The first eight tripeptides of Table 1 provide all of the essential amino acids. The glycine-alanine-alanine tripeptide satisfies a need for non-essential amino acids.

The structural formula for glycine-leucine-leucine is as follows:

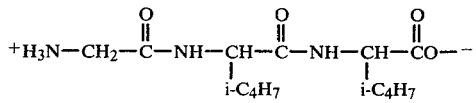

The glycine unit

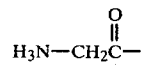

supplies the N-terminal grouping in the tripeptide or dipeptide.

A composition of dipeptides is provided in Table 2 for preparing a one-liter aqueous solution of dipeptides which supplies the human daily amino acid requirements. It will be observed that the dipeptides include a glycine residue which is the N-terminal residue.

TABLE 2

| One liter Solution | |
|---|---|
| Dipeptide | grams |
| glycine-isoleucine | 2.5 |
| glycine-leucine | 3.5 |
| glycine-lysine | 3.1 |
| glycine-methionine | 3.2 |
| glycine-phenylalanine | 3.3 |
| glycine-threonine | 1.6 |
| glycine-tryptophan | 0.63 |
| glycine-valine | 2.5 |
| glycine-arginine | 5.9 |
| glycine-histidine | 1.5 |
| glycine-alanine | 5.4 |
| glycine-glutamic acid | 6.9 |
| glycine-proline | 5.8 |

METHOD OF ADMINISTRATION

The aqueous oligopeptide solution may be ingested orally along with other nutrients such as conventional foods of prepared vitamins, fats, glucose, oligosaccharides, minerals and trace elements. For parenteral administration, a supply of the oligopeptide solution may be merged through a Y-connection with a supply of glucose solution or other parenteral solutions. In appropriate instances, the oligopeptide solution may be mixed with glucose solutions and/or other parenteral solutions to create a mixture which may be administered parenterally.

The same oligopeptide mixture for oral use can also be used for parenteral nutrition. Frequently, in the practice of medicine, situations are encountered in which patients are unable to receive their daily nutrient requirements orally. The development of total parenteral nutrition by Dudrick and colleagues (Dudrick et al, Surgery 64:134–142, 1968) has made possible the intravenous infusion of sufficient energy and essential nutrient requirements. The intravenous solutions currently used are made up of free amino acids which made these solutions hypertonic. Therefore, the solutions must be given through catheters placed in large central veins, frequently considered to be a surgical procedure. Serious complications, such as infection, have been reported to accompany this central vein method of parenteral nutrition. In addition, there could be serious complications as the result of infusion of hypertonic solutions, such as thrombosis of the vein, dehydration, and even coma. The administration of oligopeptides rather than free amino acids allows administration of the same amount of amino acid residue in solutions which are not hypertonic and therefore can be introduced into peripheral veins, which procedure is not considered to be a surgical procedure.

The concentration of the oligopeptides in an intravenous solution should be such that the amino acid composition of the solution is similar to the amino acid composition of the currently-used free amino acid solution which has shown to be satisfactory for maintaining protein nutrition.

The oligopeptides of the present compositions are water-soluble. The composition preferably contains some oligopeptides of non-essential amino acids to supply nitrogen. The composition permits intact transportation of the oligopeptide into the cells followed by intra-cellular hydrolysis.

Intravenous injection of the oligopeptides results in an increase in the insulin output when compared with the output resulting from intravenous injection of corresponding free amino acids. The oligopeptides rapidly disappear following intravenous injection, indicating that they are rapidly utilized. The speed of utilization is particularly rapid with kidney tissue; less rapid with muscle tissue.

Although the invention has been shown in connection with certain specific embodiments, it will be readily apparent to those skilled in the art that various changes in form and arrangement of steps can be made to suit requirements without departing from the spirit and scope of the invention.

I claim:

1. A nutrient composition comprising an aqueous solution containing from one to 20 weight percent of at least two oligopeptides selected from the class consisting of dipeptides and tripeptides,
   wherein the said oligopeptides include a single glycine unit which is the N-terminal amino acid residue of the oligopeptide.

2. A nutrient composition of claim 1 wherein the said tripeptides are selected from the class consisting of: Glycine-leucine-leucine, glycine-isoleucine-isoleucine, glycine-valine-valine, glycine-threonine-threonine, glycine-methionine-methionine, glycine-phenylalanine-phenylalanine, glycine-lysine-lysine and glycine-tryptophan-tryptophan.

3. A nutrient composition of claim 1 including other nutrients selected from the class consisting of fats, glucose, oligosaccharides, minerals, trace elements and vitamins.

4. A nutrient composition of claim 1 including oligopeptides having amino acid residues of all the essential amino acids.

5. A nutrient composition including the composition of claim 4 and at least one oligopeptide of non-essential amino acids.

6. A nutrient composition of claim 1 wherein the said dipeptides are selected from the class consisting of: glycine-isoleucine, glycine-leucine, glycine-lysine, glycine-methionine, glycine-phenylalanine, glycine-threonine, glycine-tryptophan and glycine-valine.

7. A method of administering a nutrient composition to a living mammal which comprises orally introducing into the said mammal the aqueous solution of claim 1.

8. The method of administering a nutrient composition to a living mammal which comprises parenterally introducing into said mammal the aqueous solution of claim 1.

9. The method of administering a nutrient composition to a living mammal which comprises intragastrointestinally introducing into said mammal the aqueous solution of claim 1.

10. The method of administering a nutrient composition to a living mammal which comprises intravenously injecting the aqueous solution of claim 1 into a periperal vein of said mammal.

11. The method of administering a nutrient composition to a living mammal which comprises merging a stream of the aqueous solution of claim 1 with a stream of another aqueous parenteral solution and injecting the resulting merged stream intravenously into the said mammal.

12. The method of claim 7 wherein the said living mammal is a living human.

* * * * *